US 8,083,250 B2

(12) United States Patent
Drake et al.

(10) Patent No.: US 8,083,250 B2
(45) Date of Patent: Dec. 27, 2011

(54) COUPLER FOR TOWED VEHICLES (75) Inventors: Frank Drake, Wausau, WI (US); Kevin Rabska, Junction City, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

(21) Appl. No.: 12/962,964

(22) Filed: Dec. 8, 2010

(65) Prior Publication Data

US 2011/0127752 A1 Jun. 2, 2011

Related U.S. Application Data (63) Continuation of application No. 12/291,455, filed on Nov. 10, 2008, now Pat. No. 7,871,098.

(60) Provisional application No. 61/002,516, filed on Nov. 9, 2007.

(51) Int. Cl.
*B60D 1/06* (2006.01)
(52) U.S. Cl. ........................................................ 280/512
(58) Field of Classification Search .................. 280/511, 280/512, 492, 493, 494
See application file for complete search history.

(56) References Cited

U.S. PATENT DOCUMENTS

| | | | | | |
|---|---|---|---|---|---|
| 1,927,591 | A | * | 9/1933 | Jacob | 280/512 |
| 2,035,486 | A | * | 3/1936 | Larson | 280/512 |
| 3,759,549 | A | * | 9/1973 | Morris | 280/512 |
| 3,820,823 | A | * | 6/1974 | Beaston | 280/512 |
| 3,880,450 | A | * | 4/1975 | Ware | 280/512 |
| 3,888,517 | A | * | 6/1975 | Ray | 280/512 |
| 4,133,553 | A | * | 1/1979 | Pierce | 280/509 |
| 4,157,190 | A | * | 6/1979 | Nyman | 280/512 |
| 4,778,196 | A | * | 10/1988 | Spoliansky | 280/512 |
| 4,804,204 | A | * | 2/1989 | Elkins | 280/512 |
| 4,898,400 | A | * | 2/1990 | Elkins | 280/427 |
| 5,382,109 | A | * | 1/1995 | Nyman | 403/316 |
| 5,421,600 | A | * | 6/1995 | Jones et al. | 280/428 |
| 5,482,309 | A | * | 1/1996 | Hollis | 280/423.1 |
| 5,582,420 | A | * | 12/1996 | Ulbrich | 280/507 |

* cited by examiner

*Primary Examiner* — Kevin Hurley
(74) *Attorney, Agent, or Firm* — McDonald Hopkins LLC

(57) ABSTRACT

Apparatus, methods, and other examples associated with a hitch ball coupler are described herein. In one example, a coupler includes a body and a cap. The body and cap are pivotally connected on a first end. The body includes a first recess and a shoulder. The cap is selectively moveable between a closed position and an open position. The cap includes a second recess that selectively forms a socket with the first recess, and an arm extending from a second end that engages the shoulder when the cap is in the open position.

20 Claims, 7 Drawing Sheets

COUPLER FOR TOWED VEHICLES

CROSS-REFERENCE TO RELATED APPLICATIONS

This application is a continuation of U.S. patent application Ser. No. 12/291,455, filed on Nov. 10, 2008 now U.S. Pat. No. 7,871,098, which claims the benefit of priority of U.S. Provisional Patent Application No. 61/002,516 entitled "COLLAR LOCK COUPLER FOR TOWED VEHICLES," filed on Nov. 9, 2007, which are both hereby incorporated by reference in their entirety.

TECHNICAL FIELD

The present invention relates generally to couplers for towed vehicles, and more particularly, to couplers that limit expansion of the coupler when in the open position.

BACKGROUND

Hitch ball couplers are often used to secure towed vehicles to towing vehicles. Common towed vehicles include campers and towing trailers arranged to secure items such as boats, automobiles, and the like. Towing vehicles most commonly include trucks, tractors, and the like. Hitch ball couplers are typically secured to a tongue extending from the towed vehicle and arranged such that the coupler may be secured to a hitch ball attached to the towing vehicle.

Couplers are often arranged so that the coupler may expand to accommodate the hitch ball from the towed vehicle. Such an expanded or open position is normally designed to allow the coupler to engage the hitch ball. However, couplers are not generally designed to withstand the rigors of supporting the towing of a trailer while the coupler is in this open position. Towing a vehicle with the coupler in the open position may result in unwanted stress on the coupler, which may lead to excessive wear and tear and damage to the coupler, and eventual failure of the coupler.

There exists a need in the coupler industry for novel apparatus and methods for couplers to expand to an open position to accommodate a hitch ball while limiting wear and tear and damage to the coupler due to stress during towing with the coupler in the open position.

SUMMARY

Apparatus, methods, and other examples associated with a hitch ball coupler are described herein. In one example, a coupler includes a body and a cap. The body and cap are pivotally connected on a first end. The body includes a first recess and a shoulder. The cap is selectively moveable between a closed position and an open position. The cap includes a second recess that selectively forms a socket with the first recess, and an arm extending from a second end that engages the shoulder when the cap is in the open position.

BRIEF DESCRIPTION OF THE DRAWINGS

Objects and advantages together with the operation of the invention may be better understood by reference to the following detailed description taken in connection with the following illustrations, wherein like numerals indicate like elements throughout, and wherein.

DETAILED DESCRIPTION

While the present application discloses apparatus and methods related to couplers by reference to examples described and illustrated herein, it should be clear that couplers of the present application should not be limited to such examples. Therefore, the description and illustration of the examples provided herein are only illustrative of couplers of the present application and should not limit the scope of couplers as claimed.

Examples of couplers for accommodating hitch balls are described and illustrated herein. In one example, a coupler is arranged so that the expansion of the coupler from a close position to an open position is limited by a physical constraint. The limitations on the expansion are such that the coupler may accommodate a hitch ball; however, stress on the components of the coupler is limited or distributed while in the expanded or open position. In one example, the coupler includes a body and a cap coupled to the body by a hinge. The hinge allows the cap to rotate about the hinge so that the coupler may expand from a closed position to an open position, where the coupler may accommodate a hitch ball. An arm coupled to or extending from the cap limits the amount of rotational expansion of the coupler by engaging a shoulder or ridge of the body upon a specific rotational expansion. While in this open position, the coupler may accommodate a hitch ball, and the engagement of the arm of the cap with the shoulder of the body transfers or distributes stress from the cap to the body of the coupler. Such transfer or distribution of stress may decrease the amount of wear and tear and damage to a coupler and result in a longer service life for the coupler.

Figure 1:
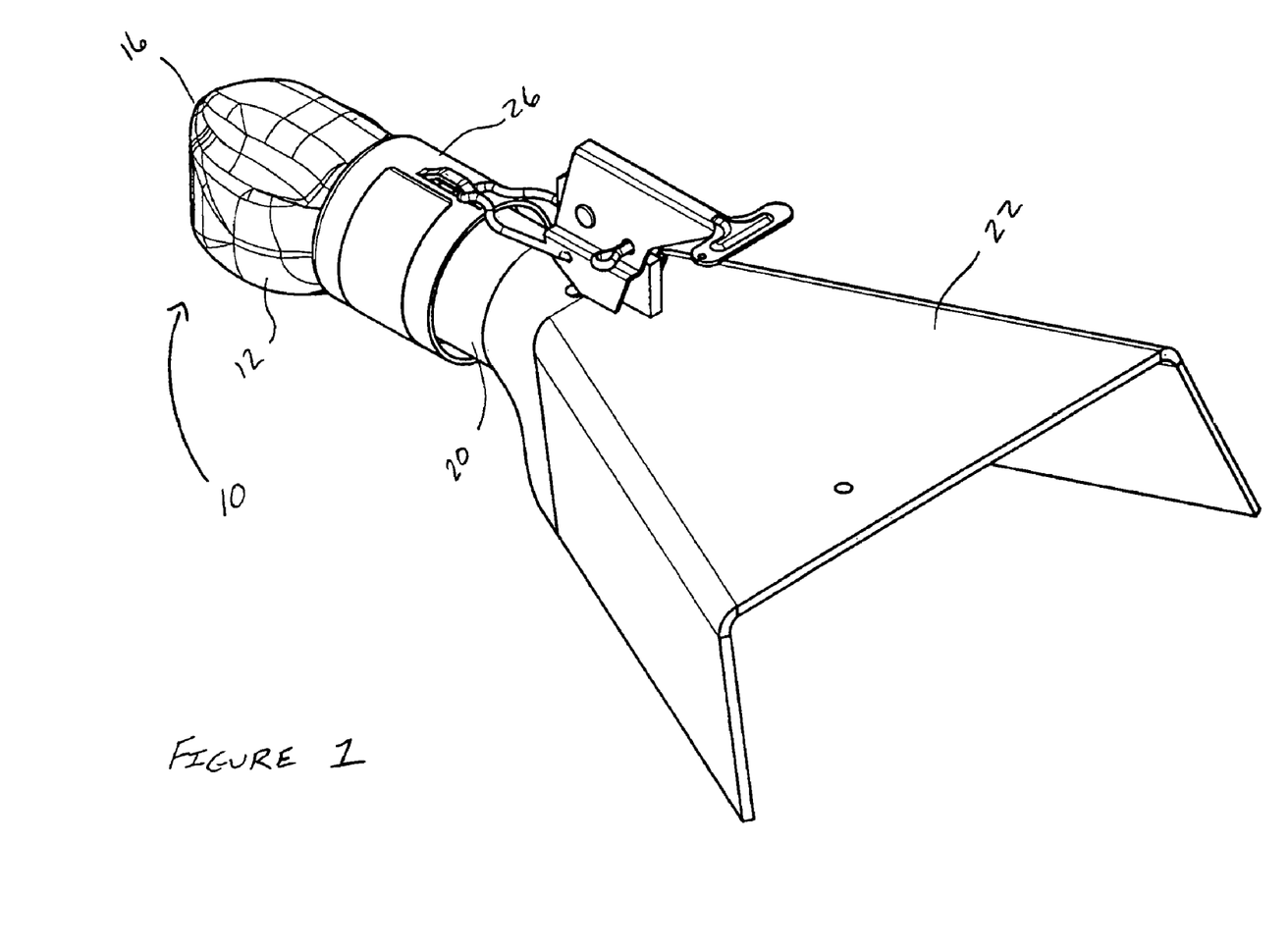
FIG. 1 is a perspective view of a hitch ball coupler.
Figure 2:
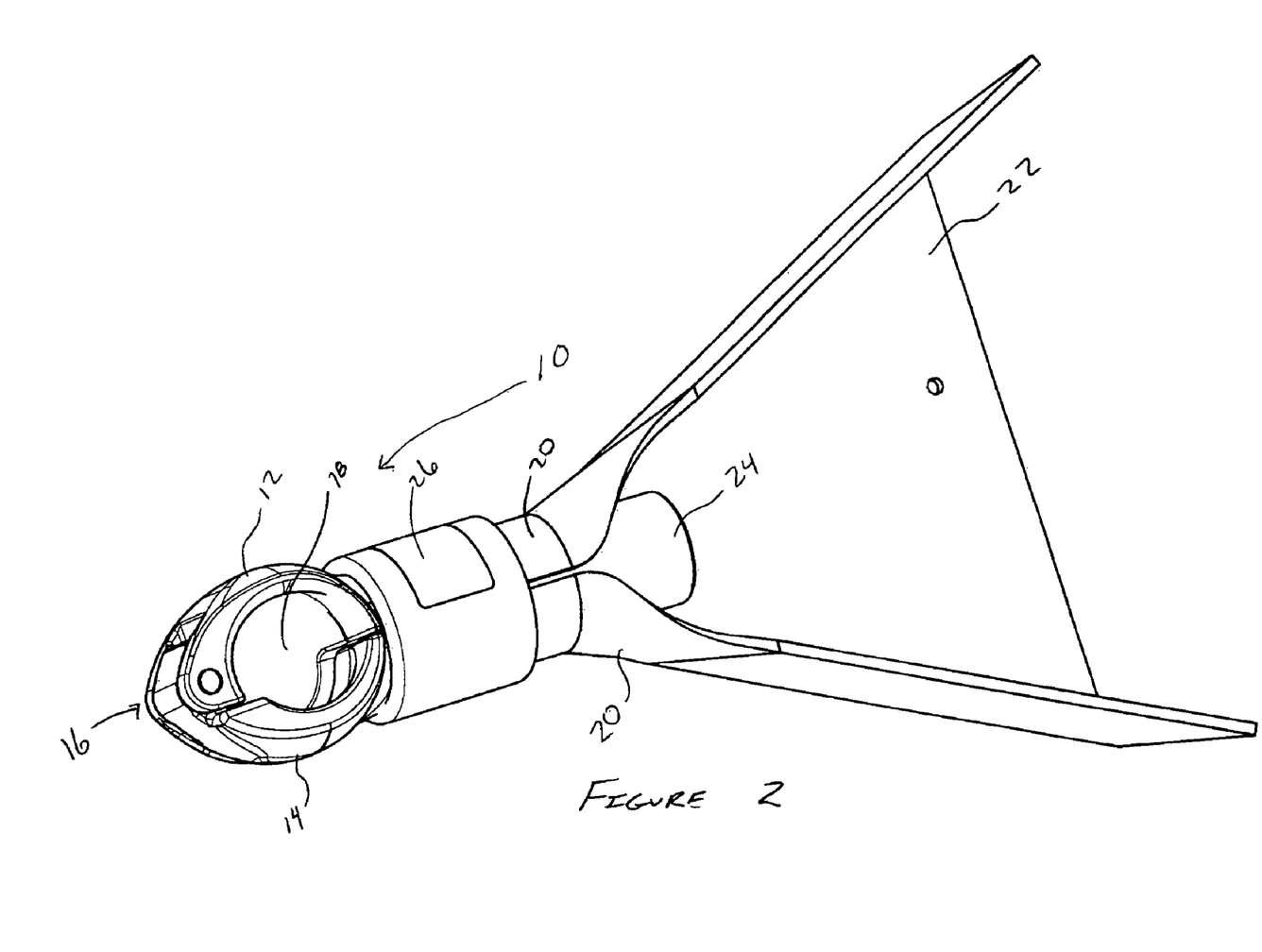
FIG. 2 is a perspective view of a hitch ball coupler.
Figure 3:
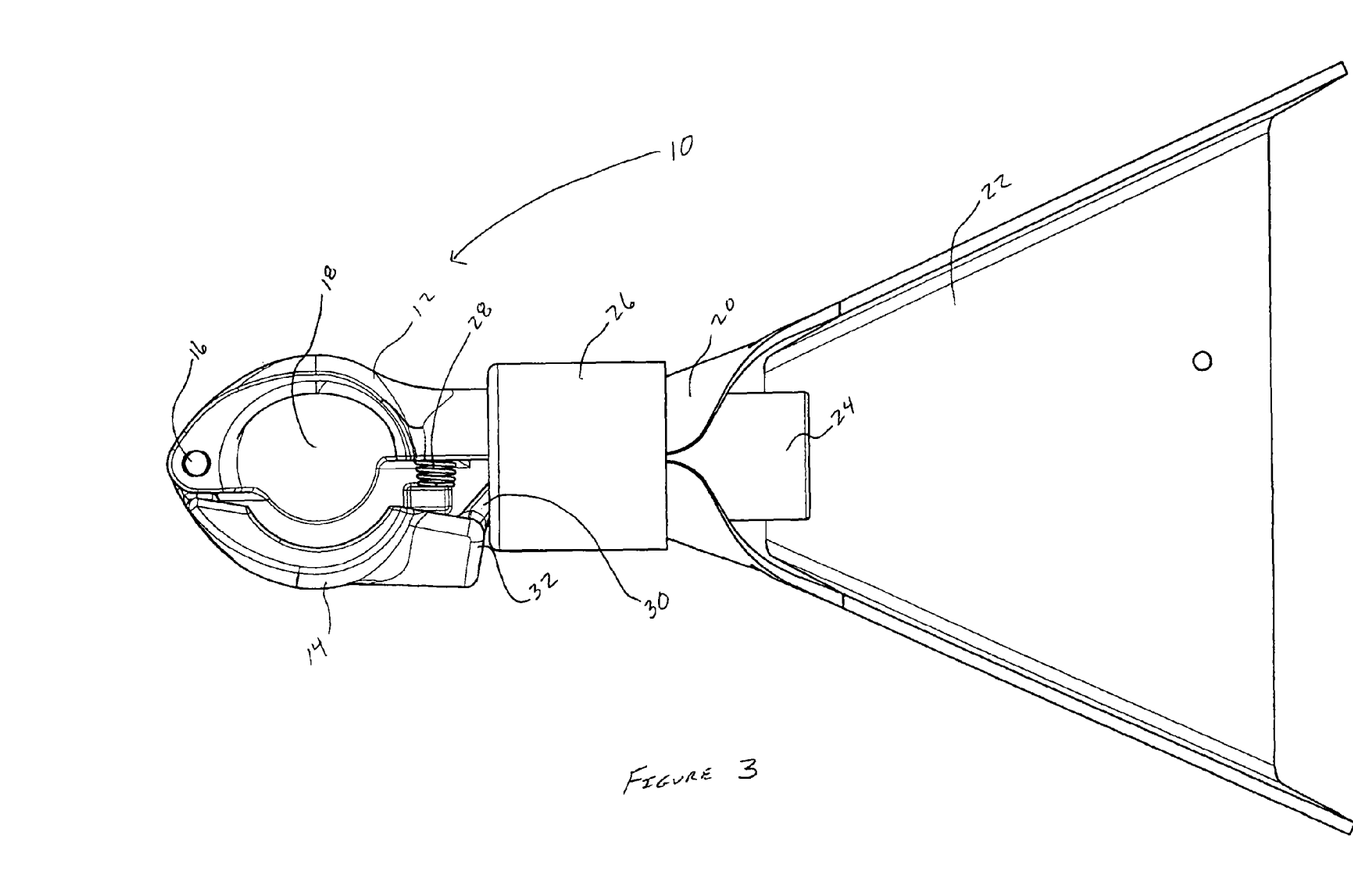
FIG. 3 is a bottom view of a hitch ball coupler.

With reference to the Figures, a hitch ball coupler 10 includes a body 12 and a cap 14. The cap 14 and body 12 are coupled together by a hinge 16 at a front or nose portion of the coupler 10. As best seen in FIGS. 2 and 3, the body 12 and cap 14 are arranged to form a cavity or a socket 18 that is generally semispherical in shape. It will be understood by one of ordinary skill in the art that recesses in both the body 12 and cap 14 may cooperate to form the socket 18. The socket 18 is generally arranged to accommodate or receive a spherically shaped hitch ball mounted to a towing vehicle. The socket 18 may be arranged to accept hitching components that have shapes other than spherical depending on the intended use of the coupler 10. The body 12 includes a sleeve 20 at its rear portion 34 that may be secured directly to a tongue 22 of a towing trailer. In another example, the sleeve 20 may be secured to the tongue 22 by a shank 24.

The coupler 10 may be arranged so that the cap 14 may rotate about the hinge 16 or otherwise move between a closed position and an open or expanded position. The closed position is best shown in FIG. 2. In the closed position, the cap 14 and body 12 are in contact at the hinge 16 and at the portion opposite the hinge 16. It will be understood by one of ordinary skill the art that when a hitch ball is received in the socket 18 and the coupler 10 is in the closed position, the coupler 10 physically secures the hitch ball. The open position is best shown in FIG. 3. In the open position, the cap 14 and body 12 are in contact at the hinge 16, but are separated at the portion opposite the hinge 16. It will be understood by one of ordinary skill the art that when the coupler 10 is in the open position, a hitch ball may be selectively received and removed from the socket 18 of the coupler 10. It will be further understood by one of ordinary skill in the art that when the coupler 10 is in the open position and the hitch ball is received by the socket 18, an operator of the towing vehicle may choose to proceed with driving the towing vehicle to tow the towed vehicle. As will be described further, the coupler 10 may be arranged so that during such towing operations, stress placed on the coupler 10 by the attachment to the hitch ball and the weight of the towed vehicle may be transferred or distributed by the arrangement of the coupler 10 to limit wear and tear or damage to the coupler 10.

The coupler 10 may include a collar 26 mounted to either the rear portion 34 of the body 12 or the shank 24. The collar 26 may be mounted so that it may slide toward and away from the cap 14 and body 12. As shown in FIG. 2, when the coupler 10 is placed in the closed position, the collar 26 may be slid toward the cap 14 and body 12 to hold the cap 14 proximate to or in contact with the body 12. Such an arrangement secures the cap 14 in close proximity with the body 12 and, thus, secures the coupler 10 in the closed position. When the collar 26 is slid rearward and away from the cap 14 and body 12, the cap 14 is free to rotate about the hinge 16 into the open position shown in FIG. 3. In an example, the collar 26 may be operably coupled to an actuating handle that is pivotably mounted on the tongue 22 of the trailer wherein the handle is operable to slide and hold the collar 26 in either the forward or rearward positions. In another example, the cap 14 may include a rear face that engages the front edge of the collar 26 when the coupler 10 is in the open position, whereby the cap 14 holds the collar 26 in the rearward position. Other arrangements operable to slide or hold the collar 26 in a position will be apparent to one of ordinary skilled in the art.

In one example, a spring 28 may be arranged in the coupler 10 to bias the coupler 10 to the open position. The spring 28 may be secured to the body 12 and in contact with the cap 14 to bias the coupler 10 into the open position. In another example, the spring 28 may be secured to the cap 14 and in contact with the body 12 to bias the coupler into the open position. In yet another example, the spring 28 may be secured to both the body 12 and the cap 14. It will be understood by one of ordinary skill in the art that a biasing member may be configured in a variety of arrangements to bias the coupler 10 into an open position.

A spring or other biasing member may bias the collar 26 toward the cap 14 and body 12, i.e., a forward position. When the collar 26 is in the forward position, it may releasably secure the cap 14 proximate to or in contact with the body 12 to secure the coupler 10 in the closed position. It will be understood by those of ordinary skill in the art that the collar 26 may be moved or slid away from the cap 14 and body 12 to a rear position to release the cap 14 from contact with the body 12. This allows the spring 28 to move the coupler 10 to the open position. It will also be understood that once the coupler 10 is in the open position, the collar 26, whether spring loaded or not, may not be able to move forward to secure the coupler 10 in a closed position until the cap 14 is moved back into contact with the body 12 to place the coupler 10 in the closed position. Because of such an arrangement, it is not uncommon for an operator to tow a trailer while a coupler is in the open position. Such towing may result in increase amounts of stress on components of a coupler such as a hinge connecting a cap to a body. Over time, if such increased stress is not addressed, the hinge may become worn or damaged, which may lead to failure of a coupler.

Figure 4:
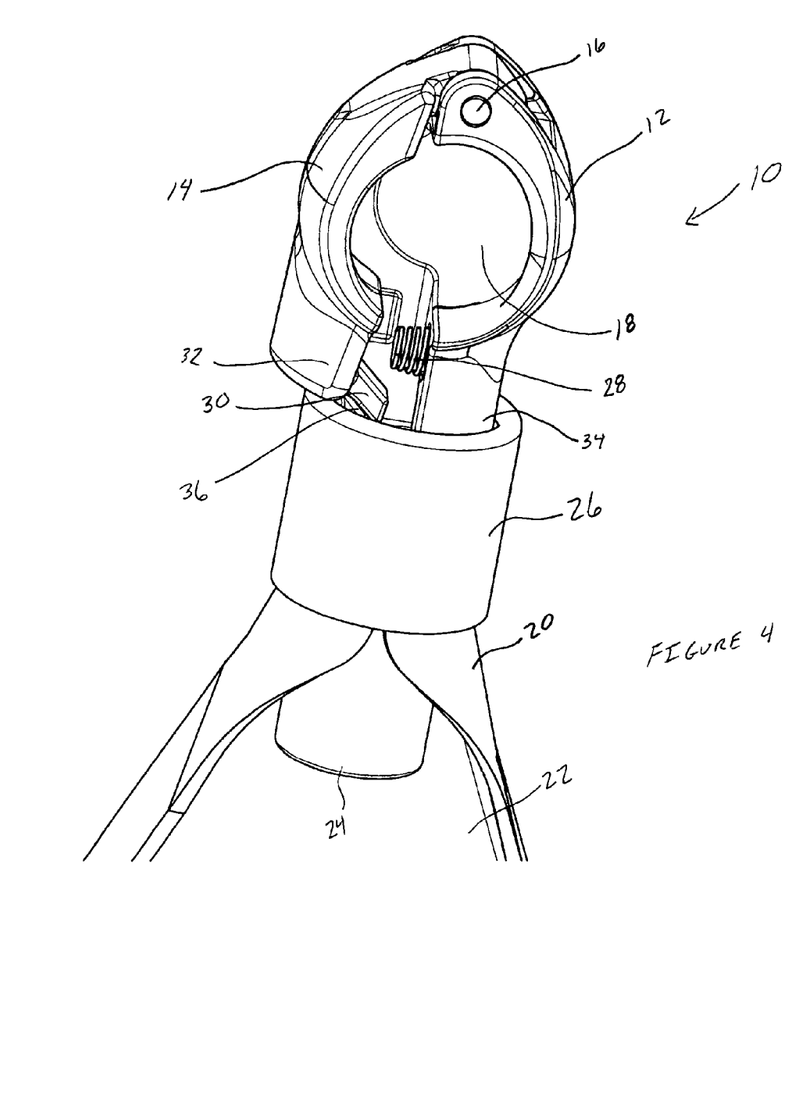
FIG. 4 is a bottom view of a hitch ball coupler.
Figure 5:
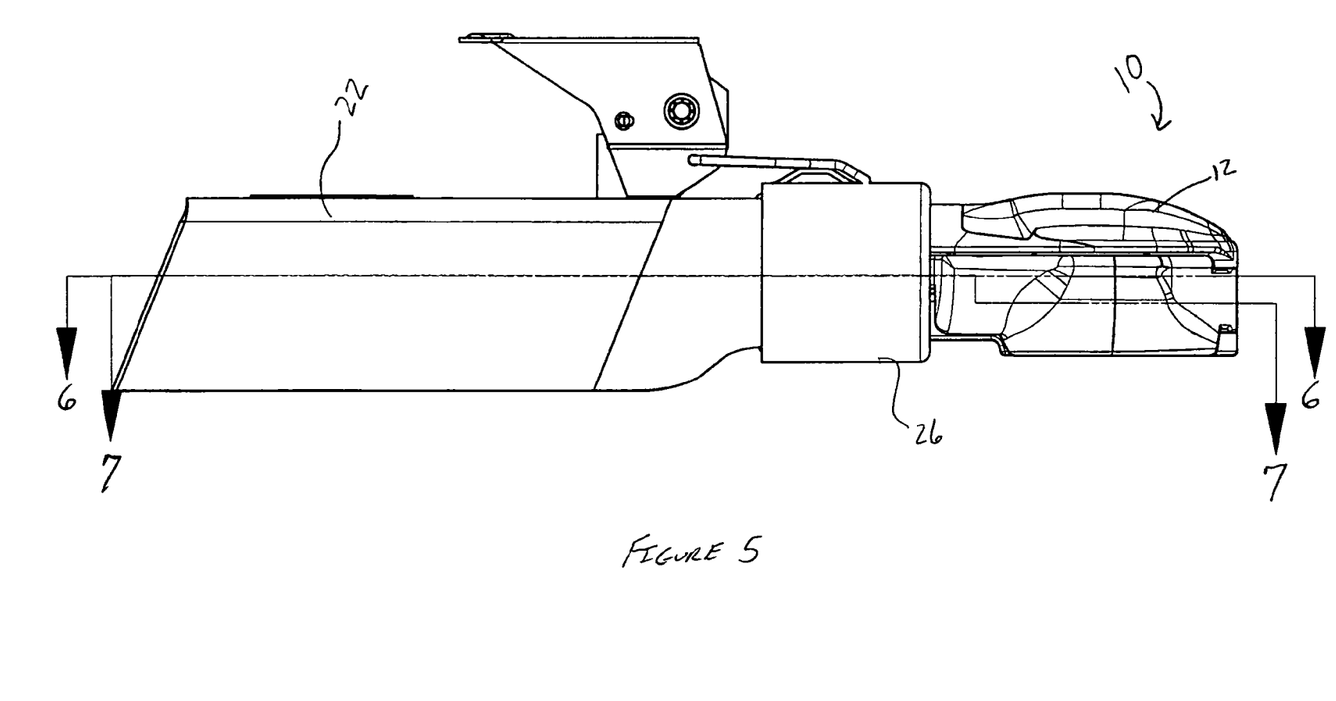
FIG. 5 is a side view if a hitch ball coupler.
Figure 6:
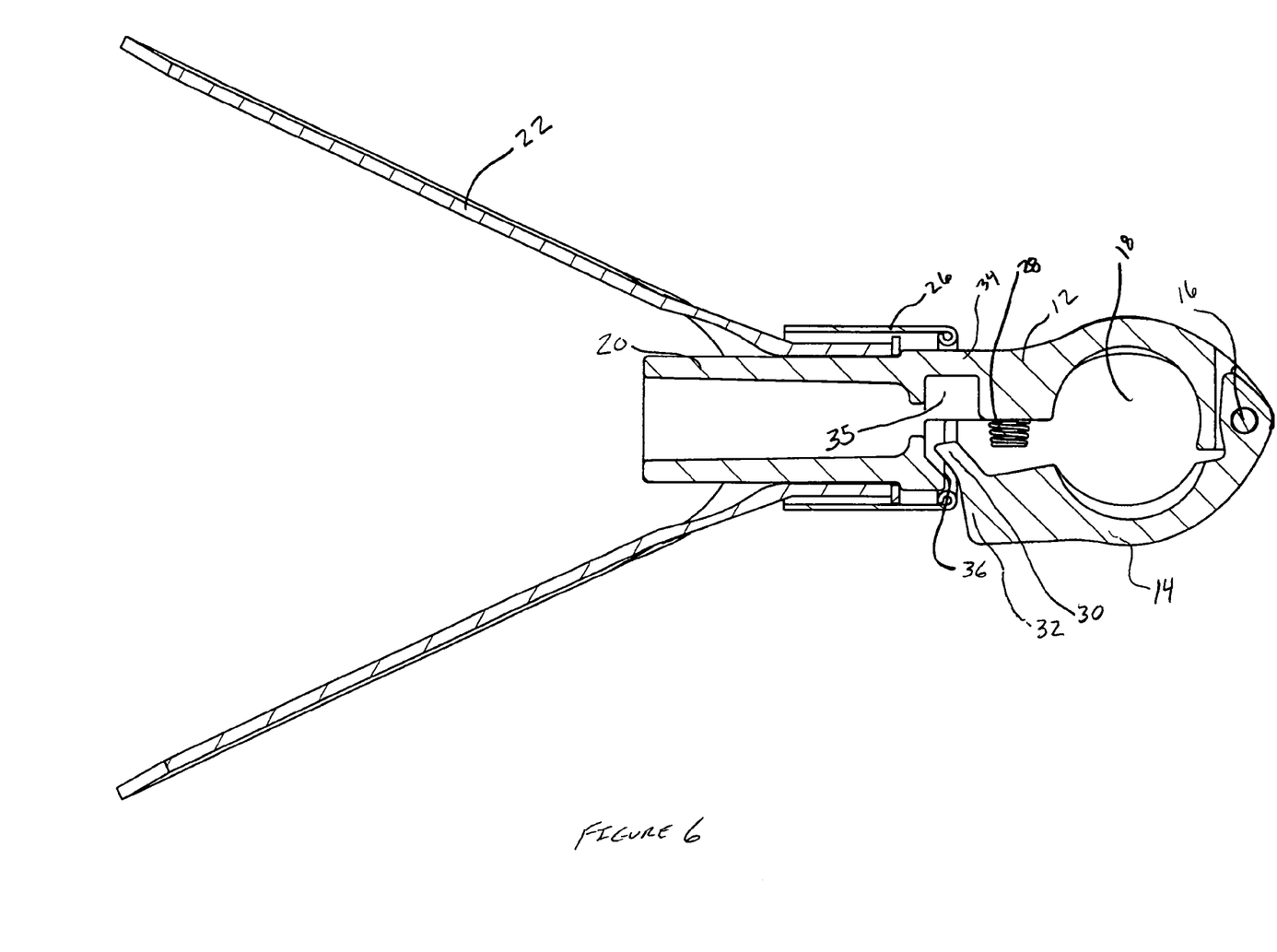
FIG. 6 is a cross-sectional view of a hitch ball coupler taken along the line 6-6 of FIG. 5.
Figure 7:
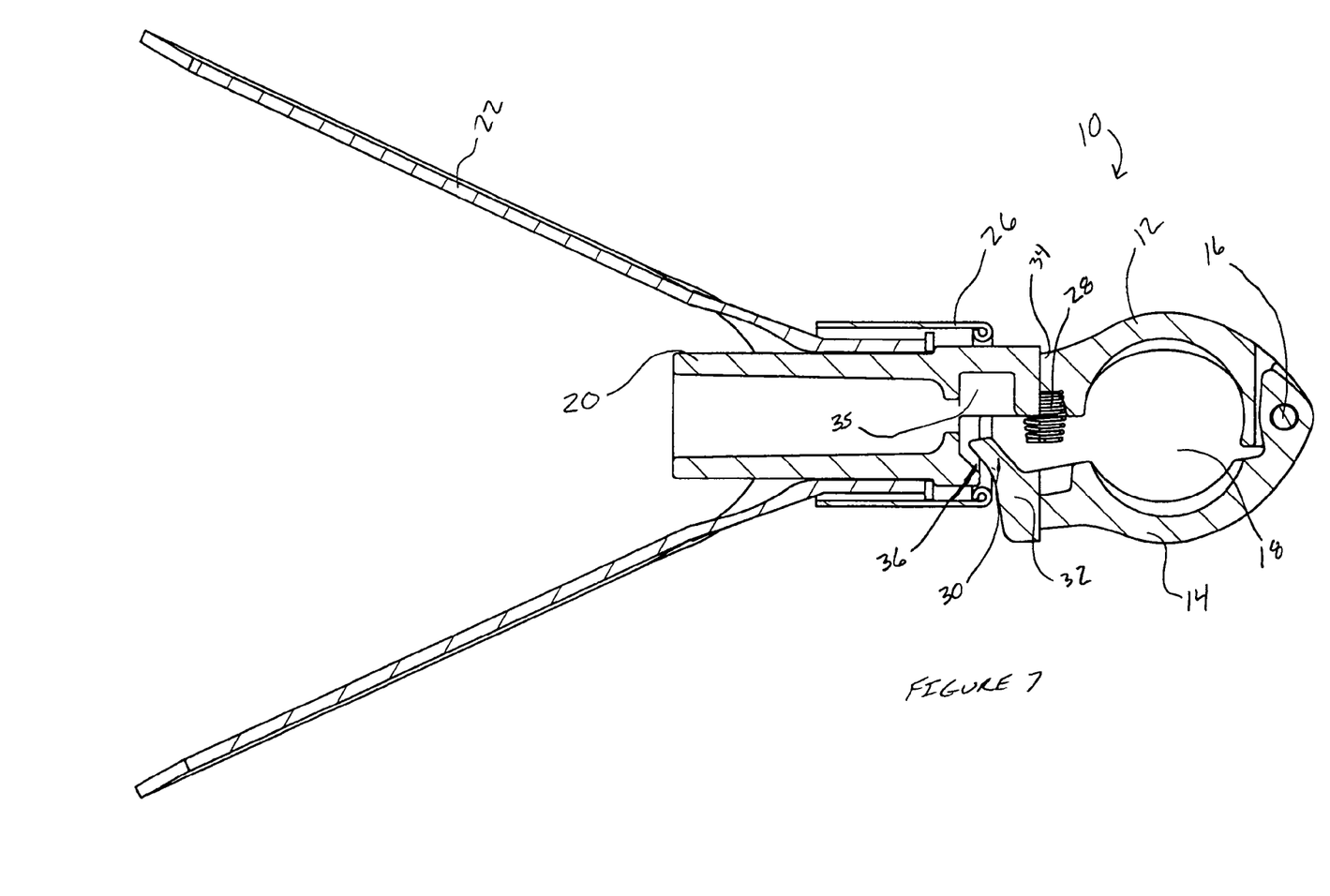
FIG. 7 is a cross-sectional view of a hitch ball coupler taken along the line 7-7 of FIG. 5.

As seen in FIGS. 3 and 4, the cap 14 includes an arm or tang 30 projecting outwardly from a rearward portion 32 of the cap 14. The cap 14 may be formed so that the arm 30 is integral to the rear portion 32 of the cap 14. In another example, the arm 30 may be a separate component that is secured to the rear portion 32 of the cap 14 by suitable means, including but not limited to welding, sintering, adhesives, fasteners, and the like. A rear portion 34 of the body 12 may include a recess 35 to receiving the arm 30 projecting from the rear portion 32 of the cap 14 when the cap 14 is in the closed position. The rear portion 34 of the body 12 also may include a shoulder or ridge 36. As is best shown in FIG. 4, when the coupler 10 is in the open position, the arm 30 engages the shoulder 36. The shoulder 36 operates as a stop to limit the rotation of the cap 14 relative to the body 12. Thus, the arrangement of the arm 30 and shoulder 36 defines the extent of the expansion of the coupler 10 from the closed position to the open position.

When the coupler 10 is in the open position, the load from the towed vehicle is distributed among the hinge 16, the arm 30, shoulder 36, and other components of the coupler 10. The load is partially distributed from the cap 14 to the body 12 by the contact of the arm 30 with the shoulder 36. It will be understood that such an arrangement transfers stress away from the hinge 16, thereby reducing stress on the hinge 16 and extending the service life of the coupler 10.

In one exemplary method, the collar 26 is slid away from the cap 14 and body 12 in order to move the coupler 10 to the open position. As the collar 26 is slid rearward, the spring 28 biases the cap 14 so that the cap 14 pivots about the hinge 16 toward the open position. As the cap 14 pivotally moves, the arm 30 engages the shoulder 36 and further rotational movement of the cap 14 is stopped. Once the coupler 10 is in the open position, a hitch ball from the towing vehicle may then be disposed within the socket 18. The towed vehicle may now be towed with the ball disposed in the socket 18 and the coupler 10 in the open position. As previously discussed, the load on the coupler 10 from towing in the open position is distributed among the hinge 16, arm 30, shoulder 36, and other coupler components, thus, limiting wear and tear and damage to the coupler 10.

Once a hitch ball is disposed within the socket 18, the cap 14 may then be manually pivoted to the closed position by applying a force to the cap 14 to overcome the biasing force of the spring 28. Once the coupler 10 is in the closed position, the collar 26 may be moved forward over the cap 14 and body 12 to secure the coupler 10 in the closed position. In one example, the outer surface of the rear portion 32 of the cap 14 may be tapered such that it facilitates the movement of the collar 26 toward the cap 14 so that the collar 26 easily slides over the tapered surface of the cap 14.

Further, it will be understood that as the cap 14 is pivoted to the closed position, the arm 30 disengages from the shoulder 36 as the rear portion 32 of the cap 14 is moved proximate to the rear portion 34 of the body 12. After the cap 14 is in the closed position, the collar 26 may be released or otherwise moved forward, wherein the collar 26 encompasses the rear portion 32 of the cap 14 and the rear portion 34 of the body 12 to secure the coupler 10 in the closed position and secure the hitch ball in the socket 18.

A shank may be forged from steel and have a solid cross-section. Such a shank adds a significant amount of weight to the coupler assembly. In addition, the forging method employed in manufacturing the shanks is imprecise and results in variations between shanks As a result, the forged shanks often require a secondary manufacturing operation, such as machining, to bring them within tolerance. The shank 24 as described and illustrated herein may extend from a rear portion 34 or sleeve 20 of the body 12. In one example, the shank 24 may be integral with the body 12 or may be a separate component that is affixed to the rear portion 24 of the body 12 by any suitable means, including but not limited to welding, sintering, adhesive, fasteners, and the like. In an example, the shank 24 may be constructed from a cast metal and have a hollow, circular cross-section that provides substantial weight savings over a solid steel shank. However, it will be appreciated that the shank 24 may be constructed from any suitable material (e.g., metal, polymer, composite, etc.) and have any suitable cross-section including but not limited to elliptical, triangular, square, rectangular, hexagonal, octagonal, and the like. The shank 24 may be coupled to a tongue 22 of a trailer by any suitable means, including but not limited to welding, sintering, adhesive, fasteners, and the like.

The invention has been described above and, obviously, modifications and alternations will occur to others upon a reading and understanding of this specification. The claims as follows are intended to include all modifications and alterations insofar as they come within the scope of the claim or the equivalents thereof.

We claim:

1. A coupler assembly for attaching a towed vehicle to a towing vehicle, the coupler assembly comprising:
    a body capable of being coupled to the towed vehicle;
    a collar mounted on the body;
    a sleeve integrally formed as a unitary member with and extending from the body, the sleeve having a hollow central portion; and
    a cap having a first end, the cap pivotally coupled to the body at the first end of the cap, the cap being selectively moveable between a closed position and an open position.

2. The coupler assembly of claim 1, wherein the sleeve is generally circular in cross-section.

3. The coupler assembly of claim 1, further comprising a tongue having a first portion and a second portion, the first portion coupled to the towed vehicle and the second portion coupled to the sleeve.

4. The coupler assembly of claim 1, wherein the body includes a first recess and the cap includes a second recess that forms a socket with the first recess.

5. The coupler assembly of claim 1, wherein the hollow central portion extends an entire length of the sleeve.

6. The coupler assembly of claim 1, wherein the collar is capable of being slid toward the cap securing the cap in the closed position and capable of being slid away from the cap securing the cap in the open position.

7. A coupler assembly for a towed vehicle, the coupler assembly comprising:
    a body capable of being attached to the towed vehicle, the body having a first recess;
    a shank extending from the body toward the towed vehicle, the shank having a hollow cross-section; and
    a cap pivotally coupled to the body at a first end of the cap and selectively moveable between a closed position and an open position, the cap having a second recess that forms a socket with the first recess.

8. The coupler assembly of claim 7, wherein the hollow cross-section of the shank is generally circular.

9. The coupler assembly of claim 7, further comprising a tongue having a first portion and a second portion, the first portion coupled to the towed vehicle and the second portion coupled to the body.

10. The coupler assembly of claim 9, wherein the shank secures the body to the tongue.

11. The coupler assembly of claim 7, wherein the shank has a hollow cross section along its entire length between the body and the towed vehicle.

12. The coupler assembly of claim 9, further comprising a collar mounted to the body, wherein the collar is capable of being slid toward the cap securing the cap in the closed position and capable of being slid away from the cap securing the cap in the open position.

13. The coupler assembly of claim 12, further comprising an actuating handle having a first portion and a second portion, wherein the first portion is coupled to the collar and the second portion is pivotably coupled to the tongue.

14. The coupler assembly of claim 7, wherein a collar is mounted to the shank.

15. A coupler assembly for attaching a towed vehicle to a towing vehicle, the coupler assembly comprising:
    a body having a rear portion;
    a sleeve extending from the rear portion of the body, the sleeve having a hollow cross section;
    a shank extending from a rear portion of the sleeve, the shank having a hollow cross section;
    a cap pivotally coupled to the body at a first end of the cap and selectively moveable between a closed position and an open position;
    a collar mounted to the rear portion of the body; and
    a handle operably coupled to the collar, wherein the handle is operable to slide the collar in first and second positions.

16. The coupler assembly of claim 15, wherein the shank is integrally formed with the body.

17. The coupler assembly of claim 15, further comprising a tongue having a first portion and a second portion, the first portion coupled to the towed vehicle and the second portion coupled to the sleeve.

18. The coupler assembly of claim 17, wherein the handle includes a first portion and a second portion wherein the first portion is operably coupled to the collar and the second portion is pivotably mounted on the tongue.

19. The coupler assembly of claim 18, wherein the handle is operable to slide and hold the collar in either a forward or rearward position.

20. The coupler assembly of claim 17, wherein the handle is capable of sliding the collar toward the cap securing the cap in the first position and capable of sliding the collar away from the cap securing the cap in the second position.

* * * * *